June 12, 1962  U. OPRECHT  3,038,307
COUNTER-ROTATING TURBINE WHEELS AND AUXILIARY
BUCKET WHEEL CONTROL DEVICE
Filed Feb. 25, 1959
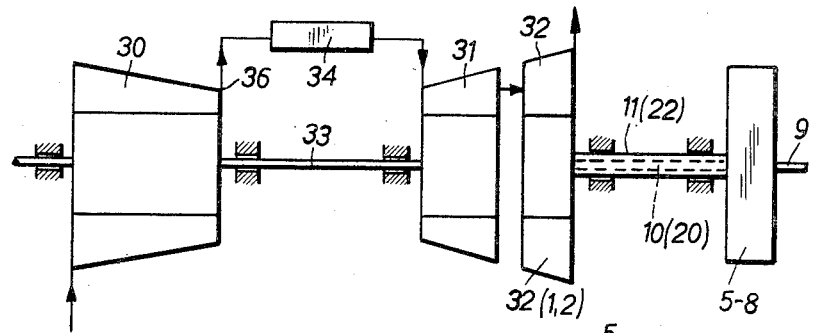
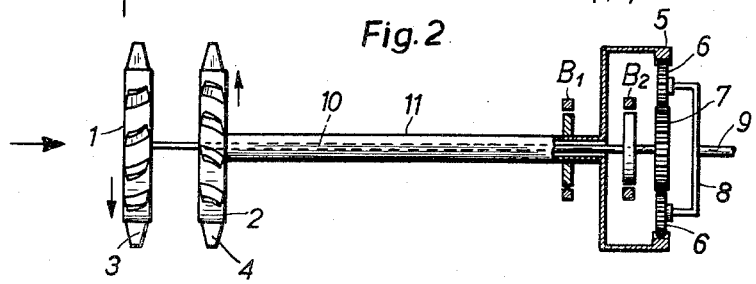
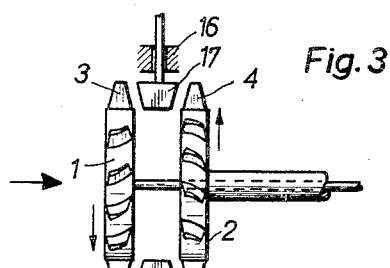
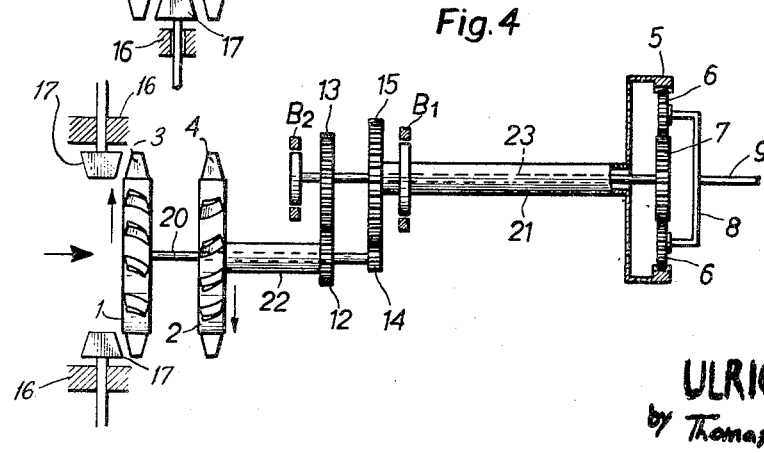
INVENTOR
ULRICH OPRECHT
by Thomas V. Michaelis
Atty

United States Patent Office 3,038,307
Patented June 12, 1962

3,038,307
COUNTER-ROTATING TURBINE WHEELS AND AUXILIARY BUCKET WHEEL CONTROL DEVICE
Ulrich Oprecht, Wittenbach, Switzerland, assignor to Adolph Saurer, Ltd., Arbon, Switzerland
Filed Feb. 25, 1959, Ser. No. 795,454
Claims priority, application Switzerland Feb. 25, 1958
3 Claims. (Cl. 60—39.16)

The present invention relates to power plants, and more particularly to gas turbine power plants for use in vehicles, including two turbines, one of the turbines driving the compressor while the other, which is mechanically separated from the first-named turbine, handles the remaining drop and yields the effective power.

It is a primary object of the present invention to provide a gas turbine plant of the above noted type, wherein the starting torque is materially increased while at the same time a reverse gear is provided, which, from the standpoint of transmission technique, is particularly simple, and the braking capacity when the vehicle is in motion is conspicuously enhanced.

Other objects, and the manner in which the same are attained, will become apparent as this specification proceeds.

The invention contemplates providing at least part of the power turbine with oppositely oriented bucket rings. Advantageously, the power components absorbed by the oppositely oriented bucket rings are combined in an addition gear and passed into a sole driven shaft. The addition gear, preferably, is provided in the form of a single step planetary gear, the effective power being taken off the satellite carrier of the planetary gear.

In the drawing accompanying the present specification and forming part thereof, several embodiments of the invention are shown diagrammatically by way of example.

In the drawing:

FIG. 1 is a diagrammatic showing of a gas turbine power plant including the associated gearing;

FIG. 2 is a similar showing of details of the power turbine of FIG. 1 including the associated gearing and the power delivery shaft;

FIG. 3 is a similar showing of the left-hand part of the system of FIG. 2, including an additional stationary bucket ring and buckets or vanes arranged for rotary displacement during operation, and FIG. 4 shows a power turbine installation according to FIG. 2, modified, however, by insertion of a reduction gear between the power turbine and the power delivery shaft.

Referring to the drawing, wherein like elements are denoted by identical reference numerals, and first to FIG. 1, the gas turbine power plant according to this invention comprises a compressor 30 and two turbines 31 and 32, respectively, the turbine 31 being arranged to drive the compressor 30, by means of the shaft 33, while the turbine 32—which is mechanically separated from the turbine 31—serves the purpose of delivering power via the shafts 10 and 11. The combustion chamber is shown at 34. The arrows and the lines connecting the same and extending between the compressor 30, the combustion chamber 34 and the turbines 31 and 32, indicate the direction of travel between the said aggregates, for the air or the working medium, respectively. The shafts 10 and 11 lead from the power turbine 32 to the gear 5–8. The power delivery shaft is shown at 9.

Referring now to FIG. 2, the power turbine 32 comprises the two turbine wheels 1 and 2 provided with oppositely oriented bucket rings 3 and 4, respectively, the turbine wheel 2 being designed as the wheel for forward speed of the vehicle, while the turbine wheel 1 is provided as the wheel for reverse motion thereof. The direction of rotation of these two wheels, when viewed from the left to the right in FIG. 2, is clockwise for the wheel 1, i.e. to the right, and counterclockwise for the wheel 2, i.e. to the left. From the turbine wheel 1, the shaft 10 extends to the sun wheel 7 of the planetary gear 5, 6, 7. The turbine wheel 2 is connected, by the shaft 11, with the outer gear rim 5 of the planetary gear 5, 6, 7. The planet pinions 6 are interposed between the outer gear rim 5 and the sun wheel 7. The shafts of the planet pinions 6 are interconnected by means of the satellite carrier 8. The driven shaft 9 is mounted on the satellite carrier 8. Thus the arrangement according to FIG. 2 is such that the effective power delivered by the turbine wheels 1 and 2 is compounded, by means of the shafts 10 and 11, in the epicyclic gear 5, 6, 7, to be delivered therefrom, via the satellite carrier 8, by the shaft 9. The shaft 10, extending from the turbine wheel 1 to the sun wheel 7, and the shaft 11, extending from the turbine wheel 2 to the outer gear rim 5, are provided with brakes $B_2$ and $B_1$, respectively, which can be operated selectively to these shafts.

The power turbine according to the embodiment of the invention shown in FIGS. 1 and 2, operates as follows:

For forward drive, the brake $B_2$ is rendered effective with the result that the turbine wheel 1 and the sun wheel 7 stand still. The brake $B_1$ being released, the turbine wheel 2 and the outer gear rim 5 revolve counterclockwise. The counterclockwise rotation of the outer gear rim 5 causes the planet pinions 6 to rotate counterclockwise and to thus roll on the stationary sun wheel 7. This, in turn, causes the satellite carrier 8 and the shaft to revolve counterclockwise, i.e. in the direction corresponding to forward drive of the turbine plant.

It is also possible, however, to have both brakes released and yet have the driven shaft 9 to rotate in the direction of forward drive. In order to arrive, in this case, at the direction of rotation required for forward drive, the bladings 3 and 4 of the turbine wheels 1 and 2, respectively, and the dimensions of the gears of the planetary gear 5, 6, 7, must be so attuned to one another that the pitch velocity of the outer gear rim 5 exceeds the pitch velocity of the sun wheel 7.

In reverse gear, the brake $B_1$ is rendered effective, and the turbine wheel 2 and the outer gear rim 5 stand still. The brake $B_2$ is released, and the turbine wheel 1 and the sun wheel 7 revolve clockwise. The rotation of the sun wheel 7 to the right, i.e. clockwise, causes the planet pinions 6 to revolve to the left, i.e. counterclockwise, and to thus roll on the stationary outer gear rim 5. This causes the satellite carrier 8 and the driven shaft 9 to revolve clockwise, i.e. in the direction corresponding to reverse motion of the turbine plant.

The gas turbine power plant corresponding to the embodiment of the invention illustrated in FIGS. 1 and 2, also involves an enhanced braking capacity, i.e. a material improvement of the braking effect on the shaft 9 when the vehicle incorporating the power plant, is in motion. With the vehicle in motion, braking is effected by applying brake $B_1$ while brake $B_2$ is released. This causes the outer gear rim 5 to stand still, and the sun wheel 7 to rotate counterclockwise. Inasmuch as the sun wheel 7 is firmly connected, via the shaft 10, with the turbine wheel 1, the latter absorbs blower energy which has a braking effect on the shaft 9.

Referring now to the embodiment of the invention illustrated in FIG. 3, this shows the turbine wheels 1 and 2, and interposed therebetween the stationary bucket ring 16 provided with buckets or vanes 17 which are susceptible of rotary displacement during operation. Instead of being disposed between the two turbine wheels, as shown in FIG. 3, such a stationary bucket ring including buckets susceptible of rotary displacement during operation, could also be disposed in front of the two turbine wheels as shown in FIG. 4. This auxiliary equipment renders possible the variation, over a wide range, of the admission to the bucket rings 3 and 4.

The rotary displacement of the guide blades 17 on the stationary ring 16 renders possible an additional variation, i.e., an increase or a reduction, in the rate of power input and the rate of flow in the bucket rings 3 and 4. Thus, for example, an increase of the power absorption and the throughput during the start of the vehicle (the two bucket rings revolving in opposite directions, facilitate the delivery of a greater torque to the driven shaft 9, is manifestly a most desirable advantage.

Referring to the embodiment of the invention illustrated in FIG. 4, a power turbine system corresponding to the embodiment shown in FIGS. 1 and 2 comprises, interposed between the turbine wheels 1 and 2, on the one hand, and the planetary gear 5, 6, 7, on the other hand, reduction gears consisting of gears 12 and 13, and 14 and 15, respectively. The interposition of these gears causes the turbine wheel 1 to be connected with the outer gear rim 5 via the shaft 20, the gear 14, 15, and the shaft 21, while the turbine wheel 2 is connected with the sun wheel 7 via the shaft 22, the gear 12, 13 and the shaft 23. As in the preceding embodiment of the invention, the effective power of the turbine wheels 1 and 2 is combined or compounded in the epicyclic gear 5, 6, 7 and by means of the satellite carrier 8, delivered to the shaft 9. The brakes $B_1$ and $B_2$ which are shown in the embodiment of FIG. 4 are actuated selectively to apply a braking force on the shafts 21 and 23, respectively. In the gas turbine power plant according to FIG. 4, the turbine blades or bucket rings 3 and 4 act in a sence opposite to that involved by the embodiment of FIG. 2, so that when viewed from the left to the right, the turbine wheel 1 turns counterclockwise, i.e. toward the left, while the turbine wheel turns clockwise, i.e. towards the right.

I wish it to be understood that I do not desire to be limited to the exact details of construction, design, function or operation shown and described, as other modifications within the scope of the following claims and involving no departure from the spirit of the invention nor any sacrifice of the advantages thereof, may occur to workers in this field.

I claim:

1. In a gas turbine power plant adapted for use in vehicles having a compressor, a turbine driving said compressor, and combustion chamber supplied with air from said compressor and supplying in turn, combustion gases to said turbine, interposed between said compressor and said compressor driving turbine, that improvement comprising an auxiliary power turbine formed with two counter-rotating turbine wheels which are mechanically separated from said compressor driving turbine; planetary gearing to combine the output derived from said counter-rotating turbine wheels of said power turbine; a sole driven shaft issuing from said planetary gearing; differentially operable brake means operatively associated with said counter-rotating turbines and said gearing and a stationary bucket wheel correlated with said counter-rotating turbine wheels and adjustable blades on said bucket wheel to vary the admission of combustion gases to said counter-rotating turbine wheels.

2. A gas turbine power plant according to claim 1, wherein the said stationary bucket wheel is interposed between said counter-rotating turbine wheels.

3. A gas turbine power plant according to claim 1, wherein the said stationary bucket wheel is disposed in front of said counter-rotating turbine wheels.

References Cited in the file of this patent

UNITED STATES PATENTS

| | | |
|---|---|---|
| 1,577,618 | Ford | Mar. 23, 1926 |
| 2,571,172 | Robin et al | Oct. 16, 1951 |
| 2,578,015 | Reinhard | Dec. 11, 1951 |
| 2,584,555 | Cleave et al. | Feb. 5, 1952 |
| 2,851,906 | De Lorean | Sept. 16, 1958 |
| 2,852,912 | Kelley | Sept. 23, 1958 |
| 2,912,824 | Van Nest et al. | Nov. 17, 1959 |